United States Patent [19]

Thompson et al.

[11] 4,025,220
[45] May 24, 1977

[54] FLUID CURRENT TURBINE WITH FLEXIBLE COLLECTORS

[76] Inventors: David F. Thompson, Box 183, Darby, Pa. 19023; William J. Mouton, Jr., P.O. Box 10515, New Orleans, La. 70181

[22] Filed: June 11, 1975

[21] Appl. No.: 580,645

[52] U.S. Cl. .............................. 415/7; 415/121 G; 415/DIG. 1
[51] Int. Cl.² .................. F04D 29/60; F04D 29/70
[58] Field of Search ................................ 415/1–4, 415/144, DIG. 1, 7, 121 G

[56] References Cited

UNITED STATES PATENTS

| | | | |
|---|---|---|---|
| 1,123,491 | 1/1915 | Corbin | 415/4 |
| 1,495,036 | 5/1924 | Palmer | 415/214 |
| 1,876,595 | 9/1932 | Beldimano | 415/60 |

FOREIGN PATENTS OR APPLICATIONS

| | | | |
|---|---|---|---|
| 26,223 | 4/1923 | France | 415/DIG. 1 |
| 56,102 | 9/1952 | France | 415/144 |
| 866,053 | 1941 | France | 415/DIG. 1 |
| 891,697 | 12/1943 | France | 415/DIG. 1 |

Primary Examiner—Henry F. Raduazo
Attorney, Agent, or Firm—Rollin D. Morse

[57] ABSTRACT

A fluid-current energy-conversion plant, especially useful for electricity generation, utilizing an axial flow turbine as the energy conversion element, has self-inflated flexible collector elements for capturing a portion of the fluid current, increasing its velocity, guiding at least some of each portion into the turbine's mouth, then returning the captured flow into the stream.

11 Claims, 4 Drawing Figures

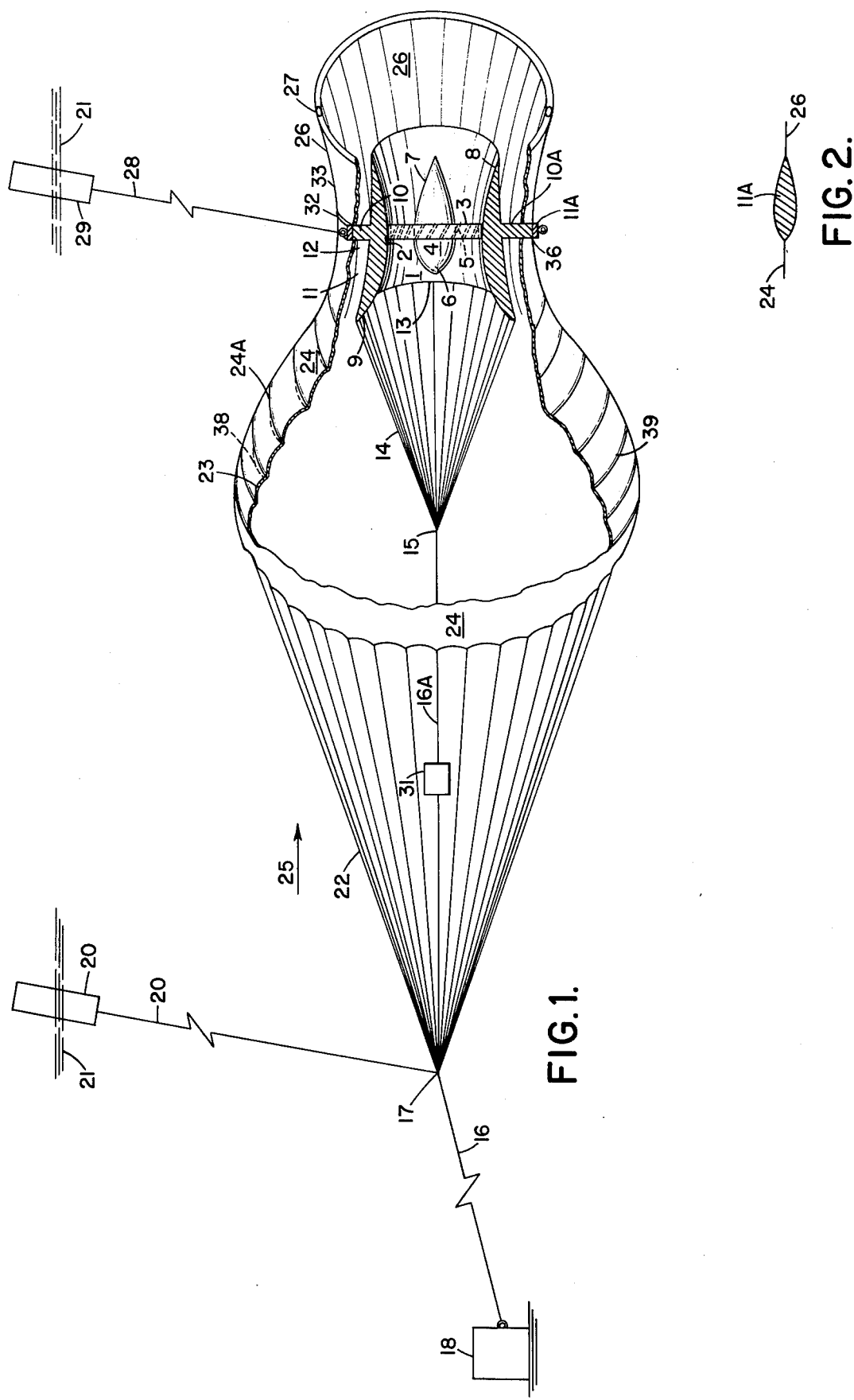

4,025,220

FLUID CURRENT TURBINE WITH FLEXIBLE COLLECTORS

INTRODUCTION

Fluid current energy-extraction devices have been known for centuries, windmills having been common for extraction of energy from the wind, and water wheels for extraction from rivers. In the production of large amounts of water power, the only systems that have proved successful have been those based on accumulation of the water behind dams, followed by flowing the water through turbine devices. Much consideration has been given to the possibility of devices for insertion into free-flowing currents of water, whereby to remove some of the energy from the water without completely cutting off the flow, or preventing navigation of the stream. However, little commercial success has been had from these devices, probably for the principal reason that devices large enough to extract commercially useful amounts of energy have required unjustifiably large capital expenditure.

In order to keep the most expensive part, the turbine wheel, to reasonable size, yet to intercept large streams of water, it has been thought necessary to build large, rigid collecting devices or funnels to guide the water stream into moderate size turbines. These rigid structures have provided streamlined passageways both inside the structure, enroute to the turbine, and on the exterior of the structure, for energy-conserving blending of the energy-depleted stream with the surrounding mainstreams; however, making them rigid and of sufficient strength to withstand the crushing and bending forces of the passing water, has made them very costly, indeed, too costly in most circumstances to justify proceeding with fluid-currrent energy-removal projects.

The present invention is concerned primarily with devices and systems for removing energy from fluid currents, utilizing collecting devices that are far less costly than those earlier contemplated in the literature.

The heart of the present invention is the application of parachute principles in the design and construction of tethers, collectors, nozzles, and diffusers, whereby flexible fabrics of good tensile strength are formed into shapes such that all of the forces incident to extraction of energy from the fluid current are converted into tensile forces within the surfaces of the fabric structures.

While the principal interest is in very large fabric structures for collecting ocean currents, guiding them through energy-extraction turbines, and subsequently re-diffusing the currents into the surrounding untreated currents, the ideas, structures, shapes are to a considerable degree applicable to smaller currents, such as those of rivers, and are also applicable to air currents, such as in windmill devices.

FIG. 1 shows a partially cut-away isometric elevation of one form of the invention.

FIG. 2 shows an alternate section of the outer nozzle shroud ring.

SUMMARY STATEMENT

Figure 3:
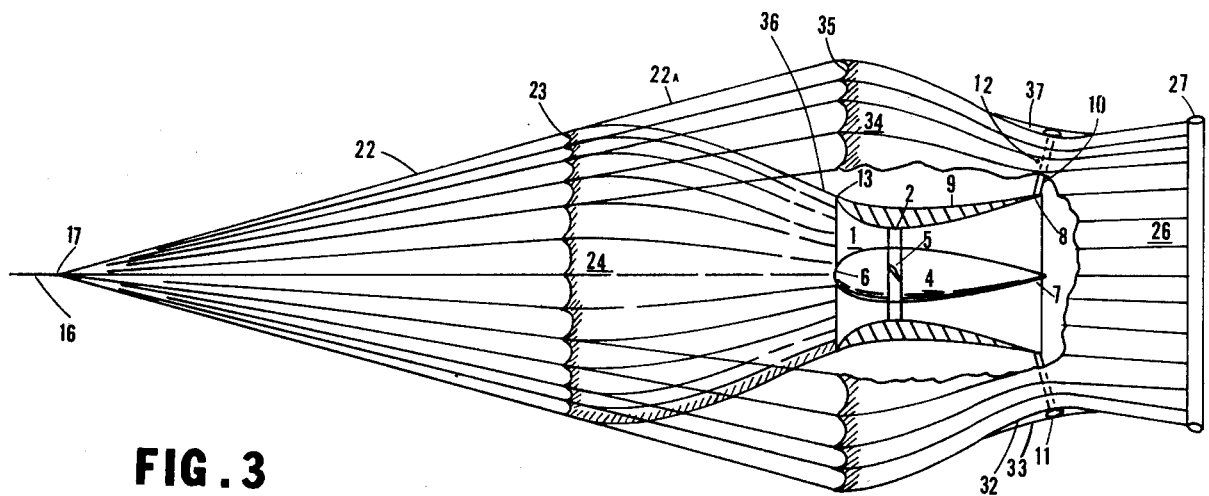
FIG. 3 shows another form of the invention.

An energy conversion system is provided for extracting kinetic energy from a portion of fluid current flowing in relatively unrestricted fashion from up stream to downstream, the system comprising in cooperative combination:

1. an axial flow turbine supported within the fluid current on axis parallel with the fluid current flow direction, for rotation under the impulse of a portion of the fluid current,
2. energy conversion means for converting and transmitting the rotational energy of the turbine into useful form,
3. a venturi nozzle of rigid construction mounted coaxially around said turbine, having an entrance, a neck with diameter only slightly larger than the turbine diameter, the turbine being positioned at the said neck, and having an exit,
4. a fluid current collector nozzle made of flexible fabric in a shape generally like a funnel having a large end considerably larger than the venturi entrance, and a smaller end, the large end being disposed upstream in the fluid current, the small end having a diameter at least as large as that of a venturi entrance, and being juxtaposed to said entrance, the nozzle having an axis generally coaxial with the turbine axis.

In one form of the invention, the flexible fluid current collector nozzle is secured around the periphery of its large end to a large number of tethering cables, all of which converge toward a common point on the turbine axis upstream of the said large end, and at said common point are attached to an anchor line which extends back to an anchor on the earth below said fluid current, while the small end of the flexible fluid current collector nozzle is attached around its periphery to the rim of the entrance of the venturi nozzle. In this form, the drag force of the turbine and venturi is transmitted as tensile force through the fabric of the flexible collector nozzle and the tether cables to the anchor line.

In another form of the invention, the small end of the flexible fluid current collector is of diameter somewhat larger than the venturi nozzle entrance, and is attached at its periphery to a ring supported on spokes extending radially outward from the exterior of the venturi nozzle, forming thereby an annular venturi surrounding the central venturi nozzle.

In other forms of the invention, a cone of longitudinal cables extends from an apex connection of the anchor cable to the periphery of the entrance to the central venturi nozzle, and serves as a trash screen and also transmits at least part of the turbine and nozzle drag force to the anchor cable.

In other forms of the invention, multiple flexible fluid current collectors are used in tandem. In one instance, the tether cables diverge in a downstream direction from their connection on the anchor cable, to the large end of a first flexible fluid current collector, the small end of which discharges into the venturi nozzle entrance, and the tether cables continue in the downstream direction to attachment points on the periphery of the large end of a second flexible fluid current collector, the small end of which is attached as afore-mentioned to a ring surrounding the central venturi nozzle, forming thereby an annular secondary venturi.

In yet other versions of the invention, the flexible fluid current collector after narrowing to its small end, then diverges in the downstream direction to a large discharge end, thereby forming a flexible velocity-reducing diffuser section for the fluid current leaving the venturi nozzle. In such case the final discharge end may terminate in a rigid ring, or may terminate in a semi-rigid ring constructed of flexible fabric, and inflated in use to establish the semi-rigid condition.

DETAILED DESCRIPTION

In the several figures, closely similar elements are designated by the same numerals. FIG. 1 shows a form of the invention in which the flexible fabric collector collects moving fluid from the fluid current and accelerates the fluid into two streams: an inner, axial stream which passes into a central venturi nozzle, through the turbine blades, and is then diffused downstream in the venturi tail; and an outer annular stream which passes through the annular secondary venturi channel at reduced pressure because of its increased velocity, whereby part of the energy of the annular stream is transferred to the axial stream in the downstream region.

In FIG. 1, numeral 1 designates a central venturi nozzle structure having a neck 2 and an expanded tail piece 8. Coaxial with the venturi nozzle, and located within it at neck 2 is an axial flow turbine wheel generally designated 4, having a shroud ring 3, blades 5, a streamlined nose 6, and a tail 7.

For the sake of clarity, and since they form no part of the inventive features, struts supporting the turbine structure on its axial position within the venturi nozzle 1 have not been shown. For similar reasons, the means for transmitting the rotational energy of the turbine to external utilization means have also not been shown; the latter might, for example, be constituted of, first, a rim drive system from the turbine shroud ring to a shaft, leading in turn to electrical generation means in a nacelle suspended immediately below the outer ring 11, the generated electrical energy being transmitted by suitable conductors lying on the ground below.

In the version of the invention shown in FIG. 1, the venturi nozzle 1 has an exterior surface 9, attached at the entrance 1a, and at the tail 8 to the venturi interior. The remainder of the exterior 9 is spaced away from the interior whereby to supply in cooperation with the inner skin 33 of the flexible collector 24 a hydrodynamically effective annular secondary venturi 12. The space between the inner venturi and its exterior 9 is provided with suitable structure not shown to give the whole nozzle the necessary strength and rigidity. Several spokes 10 extend radially outward from the nozzle exterior 9, and in turn support the nozzle outer ring 11. Spokes 10 are appropriately streamlined as indicated in partial section 10a of FIG. 1, and may be tilted to introduce reactive torque into the nozzle, and/or vortex into the fluid.

Ring 11 may have a generally rectangular section as at 11a, or alternatively, as shown in FIG. 2, it may have a streamlined section. In the first case, streamlining is provided by having the double fabrics 33 and 32 in the regions of the flexible collector 24 adjacent to ring 11, and its diffuser part, 26. In the second case, only a single layer of fabric is necessary as indicated in FIG. 2.

Reference has been made in the previous several paragraphs to the flexible collector 24, which will now be described in some detail. Parts of the design of this collector are borrowed from the technology of aerodynamic parachutes for lowering men and materials from aircraft to the ground, with descent at moderate and safe speeds. The purpose of parachutes is to convert much of the portential energy of the falling load into thermal energy of the turbulent disturbed air, whereby the remainder of the potential energy is so small that when converted to the kinetic form results only in the desirable low speed of fall.

In contrast, for the present invention, the purpose is to convert part of the kinetic energy of the fluid current to kinetic energy of the turbine, with as little as possible of conversion to thermal energy. Accordingly, rather than designing for maximum frictional drag as in the falling parachute, this invention provides for minimum skin friction and minimum turbulence (which turbulence gives internal friction in the fluid) and maximum guidance and acceleration of portions of the fluid current stream into the most desirable velocities for extraction of energy by the turbine blades.

The flexible fabric collector 24 is designed as low-friction nozzle, cutting a portion of the oncoming fluid current at the large end 23, and directing and accelerating this current toward its small end at ring 11. The collector is made of suitably shaped gores of fabric, seamed to one another, along seam lines 24a. These seams generally include reinforcing cables of suitable tensile strength, to assume part of the skin tensions and relieve the fabric of these tensions.

The small end of the collector is attached to ring 11 in a manner to provide smooth streamlining for the passing fluid current. One such manner would be to include a circumferential reinforcing cable within a peripheral hem at the small end, to which the longitudinal cables would be attached, the circumferential hem being equipped with grommets through which lacings could be made to attach the small end to corresponding eyelets on the ring 11.

The large end 23 may be constructed similarly to the small end, and to its grommets would be attached the downstream end of tethering cables 22. The upstream ends of these cables are brought to a common point 17, where they are attached to the upper end of anchor cable 16, the lower end of which is attached some distance upstream in the fluid current to a suitable anchor 18 resting on the earth below the current.

Also attached at junction 17 is the lower end of cable 19, the upper end of which is attached to a suitable supporting device 20. For use in a current of water, such as a river or ocean current, the supporting device may be a buoy floating partially submerged at the water surface 21. A "stick buoy" (that is, a vertically elongated buoy) is a stable form especially suitable, because its vertical movement in rough water is less than that of other shapes.

It is also possible to use a fully submerged buoyant device, and for use in air streams, the buoy might be an inflated lighter-than-air balloon, blimp, dirigible, or other airship.

For both water and air use, it is possible also to use suitably oriented planar or air-foil devices and these could also employ active controls to enhance stability.

While discussing this aspect of positioning the present invention, it may also be mentioned that, as shown in FIG. 1, another cable 28 and buoy 29 will be attached to the venturi nozzle system above its center of gravity, as at ring 11, to hold the entire fluid current turbine horizontal in its current.

In the version of the invention shown in FIG. 1 a cone of cables 14 converges from attachment points on the large end of the venturi nozzle 1 to a clamping point 15, at which is also attached an extension 16a of anchor cable 16. This cone of cables serves not only as a trash screen to keep trash of dangerous size from reaching and damaging the turbine blades, but also provides a means of taking part of the drag of the turbine and venturi nozzle, thereby relieving the flexible collector 24.

There may be inserted in anchor line 16a a cable tensioner 31, which by remote control means not shown may be caused to take in or pay out some length of cable 16a. Such an adjustment of length of this cable serves to provide some control of the scoop diameter of the large end 23 of flexible collector 24, by redistributing the balance of forces causing inflation of the large end.

For greatest efficiency of energy extraction from the fluid current it is desirable that the accelerated streams that have passed through the inner and secondary venturi nozzles should be discharged and diffused with minimum turbulence to a lower velocity, higher pressure form whereby the stream may be more readily assimilated and carried away by the surrounding mainstreams.

To the above end, a diffusing section, 26 of flexible fabric is provided in FIG. 1, attached to the discharge side of ring 11 and extending in downstream direction to an eventual discharge ring 27. Ring 27, as earlier mentioned, may be of rigid construction, but more preferably will be of semi-rigid construction whereby better to withstand the buffeting of the passing fluid currents. One such semi-rigid construction would use a torus or "doughnut" of flexible fabric, inflated to a moderate pressure to stiffen the torus. The diffuser part 26 is constructed and attached to its surroundings in a manner similar to the collector part 24.

FIG. 3 shows a form of the invention in which the flexible fabric collection scheme is applied twice: first, such a collector, here designated 24, is attached directly to the front or large end 1a of venturi 1, in the same manner as already described, and a secondary collector 34, positioned somewhat downstream of the collector 24, is attached to ring 11, and is followed downstream by diffuser section 26, as already described. In this instance the neck of the secondary nozzle is located further aft than was the case for FIG. 1, so that the region 12 of maximum velocity in the secondary nozzle is located adjacent to the discharge end 8 of the primary nozzle 1, whereby to provide the maximum transfer of energy from the annular stream to the central stream of the fluid current.

In this case, the tethering cables 22 also may constitute the cone-of cables trash screen, designated 14 in FIG. 1, and a suitable density of cables will be selected so as to prevent logs, very large fish, or other damagingly large objects from reaching the turbine.

Figure 4:
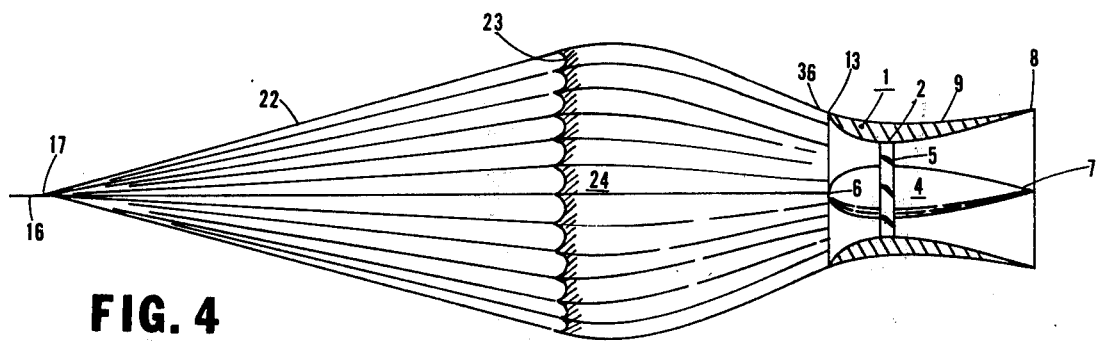
FIG. 4 shows a somewhat simplified form of the invention.

FIG. 4 shows a simple version of the invention, essentially like the version of FIG. 3, with omission of the secondary nozzle. This version would be particularly desirable for situations of relatively shallow streams of water at high velocity.

In any of the versions of the invention disclosed in the foregoing, there may be instances where reactive torques are produced, that must be overcome in order to prevent rotation of the entire collector-venturi-diffuser system. Several techniques may be used for this purpose, including the following:

a. The spokes 10 may be tilted into spiral configuration to produce a reverse torque. For this purpose, they may be pivoted at inner and outer ends, and provided with remote-control operator mechanisms for adjusting the tilt as needed.

b. Buoyant floats may be provided on upper parts, and weights on lower parts.

c. The venturi nozzle structure between inner and outer surfaces may be compartmentalized, and upper compartments air filled while lower ones are water filled.

d. The large end 23 of the flexible fluid-current collector may be provided with floats 38 and weights 39 as in (b), in which case, the open end will have increased stability, lessened tendency to flutter or collapse, greater tendency to rapid deployment upon initial insertion into the fluid current.

e. Semi-rigid inflated fins like those used on blimps may be provided on the exterior of the system, most appropriately exterior to ring 11. Such fins may be organized to provide not only the torque balancing, but also to introduce a measure of flow direction into the mainstream of the fluid current passing the exterior, whereby to improve the pressure balancing between the inner streams partially depleted of their energy, and the said mainstream where they blend together downstream of the turbine system.

Applications of this invention are foreseen both for air currents and for water currents. In the case of air currents, the buoys 20 and 29 could be blimps, dirigibles or kites, as earlier mentioned, and the ground anchor could be contained in a hanger rotable on a circle of tracks, whereby to be able to draw the turbine system directly into the hanger no matter what the wind direction might be. A portion of the lift can be provided as toroidal-shaped blimps, one encircling and attached to the mouth 23 of the flexible collector 24, one around the venturi ring 11, and another toroidal blimp can form the semi-rigid diffuser ring 27.

An important area of application of the invention is for large ocean currents, such as the Gulf Current as it flows past the coast of Florida. Here the speed is several knots, the current is several miles wide, and the depths run to thousands of feet. It is envisioned that a typical version of the invention like that shown in FIG. 1, would desirably have an entrance 23 diameter of about 400 feet, converging in the nozzle neck 2 to a turbine diameter of about 80 – 200 feet, for an area ratio of 25 – 4, respectively, corresponding to velocity increases of significant amounts above the free stream velocity.

The larger ratios would be used in low velocity currents, while the smaller ratios would be applicable to high velocity streams.

Such a system made with self-inflating flexible collector and diffuser parts, would be far less costly to build than would corresponding rigid structure. By collecting ocean current from a large area and accelerating it by a factor of several into the venturi nozzle, the turbine wheel can work in an efficient manner and at a rotational speed readily converted into the rotational speed of commercial large-power electrical generating devices.

It was earlier described that cable tensioner 31 could be used to draw the venturi nozzle upstream, thereby reducing the drag on the surrounding collector 24, and letting it baloon out to increase its collecting area. Another application of the same idea can be made in the FIG. 3 version, if the tether lines 22a for the secondary collector 34 are extended all the way upstream to an attachment apex on anchor line 16 just upstream of apex 17, with a tensioner like tensioner 31 inserted between the two apexes. By this technique the primary collector 24 and its attached venturi 1 and turbine 4 can be moved upstream or downstream relative to the throat 12 of the secondary venturi, thereby exerting a degree of control on the overall energy extraction of the system.

Yet another way to effect a control of the collector cross sectional area at its entrance, is by the introduction of a reefing capability into the mouth of the collector; in simplest form, this reefing device can be a "drawstring" around the entire mouth of the collector, which upon drawing up, reduces the mouth cross section.

What we claim is :

1. In an energy extraction system for use in a fluid current flowing from upstream to downstream, said system comprising an axial flow turbine driven by said current positioned within the neck of a co-axial venturi nozzle and in combination therewith, a flexible, funnel shaped, current in flated, fluid-current collector, coaxial with said turbine, said collector being positioned upstream of said venturi nozzle, said collector having a large upstream open end, operative to collect a portion of said current, and a smaller downstream open end, the downstream open end having a diameter at least as large as the entrance to the venturi nozzle, and being positioned relative thereto to deliver at least a portion of the flowing fluid current into the entrance of the venturi nozzle, means responsive to the fluid current flowing from upstream to downstream to inflate said collector and including means for attaching the upstream open end of the collector around its periphery comprising a divergent cone of many tether lines, said tether lines having a common upstream anchored cable.

2. The energy extraction system of claim 1, in which the smaller end of the collector is of essentially the same diameter as the entrance end of the venturi nozzle, and is attached thereto around the periphery of both the said smaller end and the said entrance.

3. The system of claim 1, in which the venturi nozzle is surrounded by a spaced coaxial nozzle ring, supported from the exterior of said venturi nozzle upon spokes extending from said exterior, and the smaller end of said collector is of the same diameter as said ring, and is attached thereto around the periphery of both said end and said ring.

4. The system of claim 3, including a flexible coaxial flaring diffuser section extending aft from the downstream side of said nozzle ring, to a diffuser discharge ring of at least semi-rigid construction.

5. The system of claim 3, in which at least a part of the drag force produced by said fluid current upon said nozzle and turbine is taken up by a means comprising of a trash screen, in the form of a cone of longitudinal cable, the said cone having its open end attached to the entrance to the nozzle and its apex to the said anchor line.

6. The system of claim 3, in which a buoyant means is provided to hold the collector, nozzle and turbine axis generally horizontal within the fluid current.

7. The system of claim 6, in which said buoyant means compresses one buoyant means is attached to the junction of the anchor cable with the apex of the cone of tether lines, and another buoyant means is attached to the venturi nozzle.

8. The system of claim 5 in which a cable tensioner is provided to act upon the anchor line between its attachment to the cone of tether lines and its attachment to the cone of cables of the trash screen.

9. The system of claim 3, including a plurality of flexible collectors all being mutually co-axial, are positioned along the anchor line, including first an upstream collector having its smaller end of the same diameter as the central venturi nozzle entrance, and arranged to deliver all of its portion of the fluid current to the said venturi nozzle, and second and later collectors being of larger diameter than the preceding, and arranged to deliver into an annular secondary venturi nozzle surrounding and coaxial with the said central venturi nozzle.

10. The energy extraction system of claim 1, in which the current-inflated fluid current collector is provided with a reefing means in the form of a drawstring around its large upstream end whereby the maximum portion of the said current can be regulated.

11. The System of claim 9, in which a tensioner means is provided along the anchor line between the apexes of the individual cones of tether lines, whereby the axial position of the individual collectors in the series of said multiple collectors can be regulated.

* * * * *